No. 664,837. Patented Jan. 1, 1901.
J. W. DAVIS, Jr.
TREE PROTECTOR.
(Application filed Oct. 10, 1900.)
(No Model.)
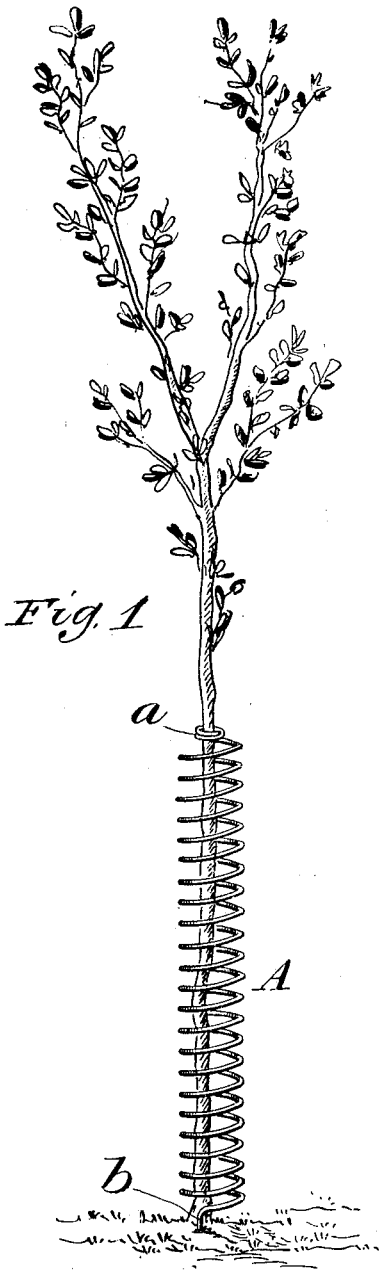
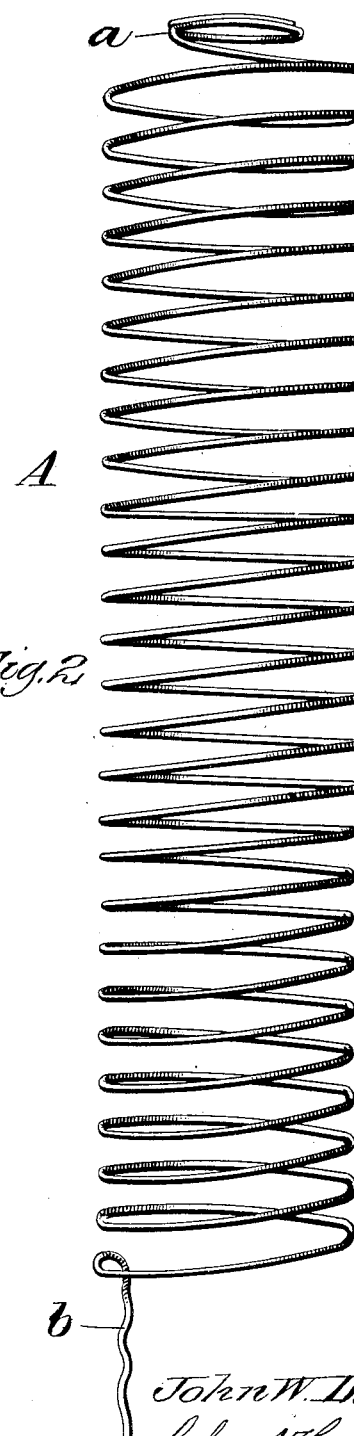
WITNESSES:
L. C. Hills
M. G. Bennet
INVENTOR
John W. Davis, Jr.,
BY Chas. H. Fowler,
Attorney

UNITED STATES PATENT OFFICE.

JOHN W. DAVIS, JR., OF CLARKSVILLE, MISSOURI.

TREE-PROTECTOR.

SPECIFICATION forming part of Letters Patent No. 664,837, dated January 1, 1901.

Application filed October 10, 1900. Serial No. 32,595. (No model.)

*To all whom it may concern:*

Be it known that I, JOHN W. DAVIS, Jr., a citizen of the United States, residing at Clarksville, in the county of Pike and State of Missouri, have invented certain new and useful Improvements in Tree-Protectors; and I do hereby declare that the following is a full, clear, and exact description of the same, reference being had to the annexed drawings, making a part of this specification, and to the letters of reference marked thereon.

The present invention has for its object to provide means for protecting young fruit-trees against injury by rabbits or other like animals; and it consists in a vibratile protector comprising a continuous coil of wire of much greater diameter than the trunk of the tree to give room for the vibration of the coils when touched by the animal, and thereby frighten it away, as will be hereinafter more fully described and claimed.

Figure 1 of the drawings is a side elevation of my improved protector, showing it in position around the trunk of a young tree; Fig. 2, a perspective view of the protector on an enlarged scale.

In the accompanying drawings, A represents the tree-protector constructed from a continuous coil of steel or other suitable wire and of any desirable length. The diameter of the coils is of necessity much greater than the diameter or circumference of the trunk of the tree, so that when in position around the same there will be sufficient space between the coils and trunk of the tree to enable the protector to vibrate when touched by any object, and thus serve as a "scarecrow" to prevent the animal from crawling up and injuring the young tree. The coils of the wire are of substantially equal diameter, with the exception of the fastening-coil $a$, which is much smaller, but sufficiently large to allow of the growth of the young tree and at the same time serve as a fastening, so as to hold the protector to the trunk of the tree at the upper end to form a rigid connection, while the coils below the fastening-coil vibrate when touched by any object, the position of the protector with relation to the trunk of the tree being shown in Fig. 1 of the drawings.

The lower end of the protector A is provided with an anchor $b$, so that the lower end of the protector may be fastened in the ground, the anchor being formed from the wire comprising the lower coil of the protector.

The anchor $b$ is preferably serpentine in shape to give thereto a better hold when in the ground.

It will be noticed that the coils of the protector are much greater in diameter than the diameter of the trunk of the tree, and in addition to the protector being connected or fastened at only its upper and lower ends the tendency is to vibrate when touched by any object.

It should be understood that when my protector is applied to young trees that are propagated for the purpose of transplanting if the tree is small and with a top of moderate size the protector may be slipped over the same and carried down to the position shown in Fig. 1 of the drawings and then the anchor thrust into the ground. Where the branches of the tree are either large or much extended, I begin with the lower end of the protector and turn the coils two or three times around the tree, (to the right or left, according as the protector is coiled,) after which the anchor is forced into the ground and the protector taken hold of at the top and turned in the reverse way around the tree until the coils are wound entirely around the same.

Having now fully described my invention, what I claim as new, and desire to secure by Letters Patent, is—

1. A tree-protector consisting of a plurality of vibratile coils of wire adapted to encircle the trunk of the tree and provided at its lower end with a suitable anchor to secure it to the ground, substantially as and for the purpose set forth.

2. A vibratile tree-protector consisting of a plurality of wire coils having an anchor at its lower end and at its upper end a fastening-coil of less diameter than the protector, substantially as and for the purpose described.

3. A vibratile tree-protector consisting of a plurality of wire coils, the wire of the lower coil terminating in a serpentine-shaped anchor, substantially as and for the purpose specified.

In testimony that I claim the above I have hereunto subscribed my name in the presence of two witnesses.

JOHN W. DAVIS, JR.

Witnesses:
P. S. FERN,
L. P. NICKLIN.